Aug. 23, 1966     J. T. GLENNON     3,267,957
GAS VALVE SERVICE BOXES WHICH ARE VENTILATED
AND OFFER CHIMNEY-ACTION FOR ESCAPING GAS
Filed July 13, 1964

INVENTOR,
Joseph T. Glennon,
BY

ATTORNEY.

United States Patent Office 3,267,957
Patented August 23, 1966

3,267,957
GAS VALVE SERVICE BOXES WHICH ARE VENTILATED AND OFFER CHIMNEY-ACTION FOR ESCAPING GAS
Joseph T. Glennon, 127 Lincoln Ave., Elizabeth, N.J.
Filed July 13, 1964, Ser. No. 382,266
10 Claims. (Cl. 137—364)

The present invention relates to improvements in service boxes which are also called valve or curb boxes. Essentially, these comprise an erect pipe downward from ground level, leading to a gas or water shut-off valve which is at a distance below ground level. The upper end of said pipe terminates in a collar or ferrule which has a closure plate. The top structure is usually flush with the ground. Upon removal of the closure member, access is had to the sunken valve by means of a socket wrench having an elongated shank. More particularly, this invention concerns itself with service boxes for a gas shut-off valve.

Many of the older communities have changed over to high pressure, lighter-than-air gas supplied to their antiquated cast iron underground mains which has brought on deterioration in pipe, connections, leaky valve cracked pipe lines in addition to leaking already incident in the mains. It is found that escaping gas tends to follow the pipe lines into houses, causing accumulations of free gas in cellars and resulting in fires and explosions which have proven disastrous. Gas companies have been involved in many damage suits because thereof.

It is therefore the principal object of this invention to provide means to direct leaking gas from entering cellars by utilizing the service box structure to serve in chimney fashion to offer draft, passage and escape for seeping gases.

Heretofore, the vertical pipe of a service box was plugged tight by the closure member to close the passage to the service supply valve.

It is therefore another object of this invention to provide the service box with a novel and improved closure lid whose association makes the sunken vertical pipe communicative with the atmosphere, converting it into a chimney stack for leaking gas accumulations along the gas main and force and afford its passage into the atmosphere before it can reach the cellar, and particularly to have a lid which has no openings straight down through it.

A further object of this invention is to provide a novel and improved service box structure of the character described, which is simple in construction, reasonable in cost and efficient in carrying out the purposes for which it is designed.

Other objects and advantages will become apparent as this disclosure proceeds.

For one practice of this invention, the upper end of a collar which is tightly fitted about the upper end of the vertical pipe of the service box structure has an outer flange which is an upright annular channel whose outer ring wall is higher than its inner ring wall. The floor wall of said channel has a series of spaced holes therethrough, opening outside the collar, a closure lid fits inside said annular ring and has a downwardly extending segmental perimetral flange whose segments as feet, stand on the channel floor, taking up only part of the width of said floor and leaving at least some part of said holes uncovered. The height of said feet is such that the underside of the lid is spaced from the inner ring wall of said annular channel and the upper surface of said lid is about flush with the upper edge of the outer ring wall of said annular channel. Said lid has downwardly extending elements to center it with respect to the collar. Indentations in the periphery of the lid at the spaces between the flange segments, offer finger holds to lift the lid and make the pipe's interior communicative with the atmosphere. The lower part of said pipe is perforated.

A detailed description of a preferred embodiment of this invention will now be given including other incidents of structure for which reference will be had to the accompanying drawing forming part of this specification, in which drawing, similar characters of reference indicate corresponding parts in all the views.

Figure 1:
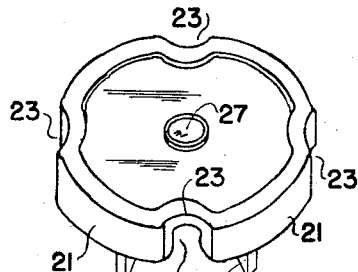
FIG. 1 is a perspective view of the lid member of a preferred embodiment of this invention.
Figure 2:
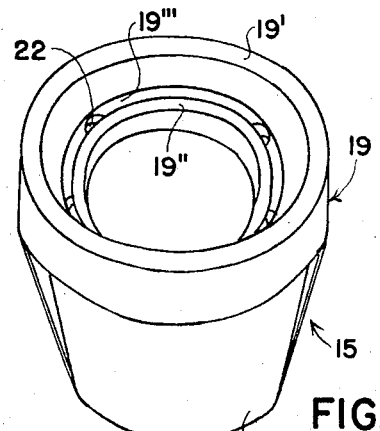
FIG. 2 is a perspective view showing the collar.
Figure 3:
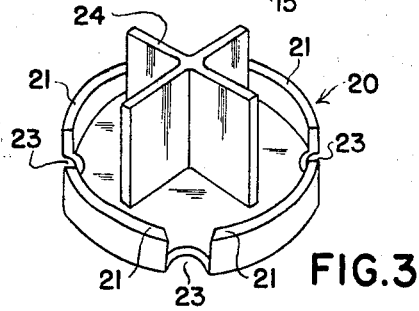
FIG. 3 shows the lid of FIG. 1 inverted. This is a perspective view.
Figure 4:
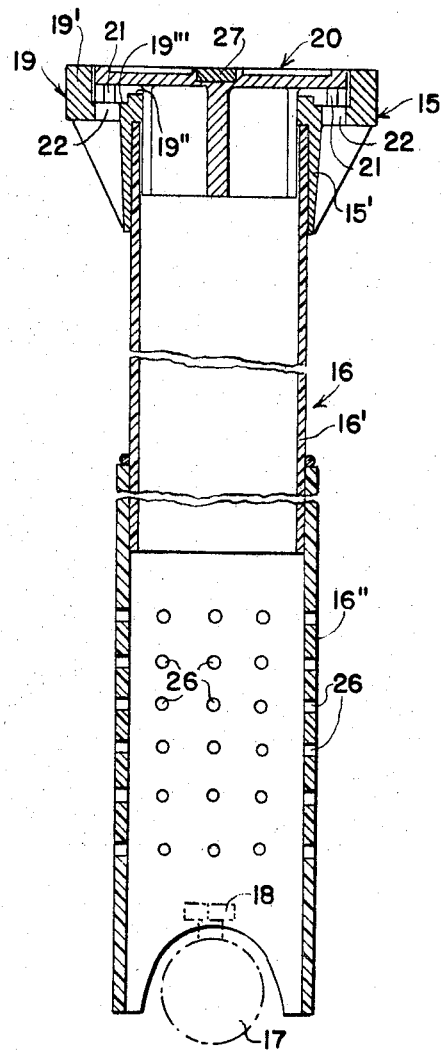
FIG. 4 is a perspective view showing a lid of modified construction, in inverted position.
Figure 5:
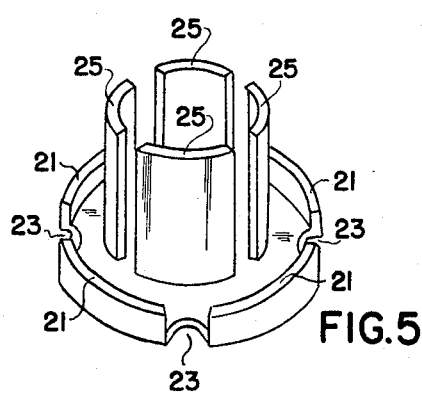
FIG. 5 is a central longitudinal sectional view of a complete service box which includes the collar and lid of FIGS. 2 and 1. In this view the gas main and the sunken control valve are indicated by dash-dot lines.

In the drawing, the numeral 15 designates generally a collar at the upper end of an erect pipe 16 which is imbedded in the ground and extends from a bit below ground level, downward to a sunken valve 17 controlling a gasline. The valve presents a bolt head 18 to be manipulated by a long-shanked socket wrench, to turn the valve to be shut or open. The upper end of said collar which is tightly fitted about the upper end of said pipe 16 of the service box structure, has an outer flange indicated generally by the numeral 19, which is an upright annular channel whose outer ring wall 19′ is higher than its inner ring wall 19″. The floor wall 19‴ of said channel has a series of spaced holes therethrough opening outside said collar, which per se is indicated as 15′. A closure lid denoted generally by the numeral 20, fits inside the outer annular ring wall 19′ and has a downward extending segmental perimetral flange, whose segments 21 as feet, stand on the channel floor wall 19‴, taking up only part of the width of said floor and leaving at least some part of said holes which are shown at 22, uncovered. The height of said feet is such that the underside of the lid 20 is spaced from the top ring surface of the inner ring wall 19″ and the upper surface of said lid is about flush with the top ring surface of the outer ring wall 19′ of said annular channel. Indentations 23 in the periphery of said lid at the spaces between the segments 21 offer finger holds to lift the lid and make the pipe's interior communicative with the atmosphere when said lid is in the collar fitting 15. Said lid has downwardly extending elements as the X-form 24 or the segments 25 to center it with respect to said collar 15. Said pipe 16 may consist of the telescope sections 16′, 16″ and it is important that the lower section be perforated as at 26.

It is evident that the interior of the pipe 16, is constantly communicative with the atmosphere though the lid 20 is in place, for there is free passage over the ring wall 19″ into the channel 19 and out through the indentations 23 in the lid's periphery. Said pipe 16 is therefore ventilated and gases which might accumulate therein would escape into the open air through the openings 28 in the lid's periphery. The tendency of leaking gas is to follow the exterior of the mains. The pipe 16 offers a hollow for escaping gas to come to for it is seeking to be released. Draft caused in the pipe 16 makes it act in chimney-fashion to draw free gas from the surrounding earth which is aided by the perforations 26. Since an avenue is offered free seeping gas to escape, it will not go beyond the valve 17, and will go up the flue offered by the pipe 16, and so none will enter adjacent cellars.

If desired, the lid 20 and the collar may have suitable cooperative releasable engagement means (not shown) to secure them, but such of course, if used, shall not interfere with the free ventilation of the pipe 16. The lid shown is a comparatively heavy casting which will stay in place by merely being placed as illustrated. Also if desired, the lid may have a centrally imbedded permanent magnet 27 to help find it in installations where it might become covered with leaves, debris or soil, by use of galvanometer devices as is well known in this art.

There are no openings in the lid 20 which are in directly downward direction and so nothing can fall into the pipe 16. The channel 19 serves as a trap for anything that may pass inward through the peripheral openings 28, and rain water would of course drain through the holes 22 into the ground.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific description and showings herein to indicate the scope of this invention.

I claim.

1. In a valve box of the character described, a pipe leading downwardly from substantially ground level to a sunken gas valve having an upright formation which is to be turned to open and shut said valve by use of a long-shanked wrench to be inserted through said pipe, a collar member mounted on the upper end of said pipe; said collar member at its upper end having an outward flange around it which is an upright annular channel having an outer ring wall and an inner ring wall and a closure lid having a plurality of feet extending downwardly therefrom and resting in said channel; said lid being positioned within said outer ring wall and substantially filling said outer ring; the undersurface of said lid being spaced from said lower ring wall; the upper surface of said lid being substantially flush with the upper ring surface of said outer ring wall; said lid having openings in its periphery which make the interior of the pipe communicative with the atmosphere.

2. A valve box as defined in claim 1, wherein said lid has a downward perimetral segmental flange; the segments of said flange constituting said feet and the spaces between said segments being the openings in the periphery of the lid.

3. A valve box as defined in claim 2, wherein said lid is provided with perimetral indentations at the locating of the location of the spaces between said segments, to serve as finger holds to lift the lid out of said collar.

4. A valve box as defined in claim 1, wherein the lid has spaced elements extending downwardly from its undersurface into said collar to center the lid with respect to said collar.

5. A valve box as defined in claim 1 wherein the pipe is perforated.

6. A valve box as defined in claim 1, wherein said channel is provided with holes so that any water coming into said channels all pass through said holes and into the ground.

7. A valve box as defined in claim 1, wherein the pipe comprises sections in telescopic sliding relation; the lowermost of said sections being perforated.

8. A valve box as defined in claim 1, wherein the lower part of said pipe is perforated.

9. In a valve box of the character described having a pipe leading downwardly from substantially ground level to a sunken gas valve having an upright formation which is to be turned to open and shut said valve by use of a long shanked wrench to be inserted through said pipe, the combination comprising a collar member on the upper end of said pipe having a flange extending outwardly from the periphery of said collar and a wall extending upwardly from the upper surface of said flange and being spaced outwardly from the upper end of said pipe, a closure lid overlying the upper end of said pipe and that portion of said flange located within the inner surface of said wall; said closure lid being dimensioned so as to substantially contact the inner surface of said wall and fit within said inner wall, having its upper surface substantially flush with the top edge of said wall, including means for spacing its lower surface from the upper surface of said flange and means providing for the passage of gases from the pipe to the atmosphere above said valve box.

10. A valve box as defined in claim 9, including means for allowing entry of gases into the interior of said pipe from the ground adjacent said valve.

References Cited by the Examiner

UNITED STATES PATENTS

| 406,253 | 7/1889 | Bingham | 137—364 |
| 1,557,885 | 10/1925 | Shanahan | 137—371 |
| 1,573,312 | 2/1926 | Fritz | 137—371 X |
| 2,099,479 | 11/1937 | Heinkel et al. | 137—367 |

FOREIGN PATENTS

| 90 | 1/1902 | Great Britain. |

M. CARY NELSON, *Primary Examiner.*

H. KLINKSIEK, *Examiner.*